W. H. THOMAS.
COMBINATION FENDER BRACE AND BUMPER.
APPLICATION FILED OCT. 9, 1920.
1,379,946.
Patented May 31, 1921.
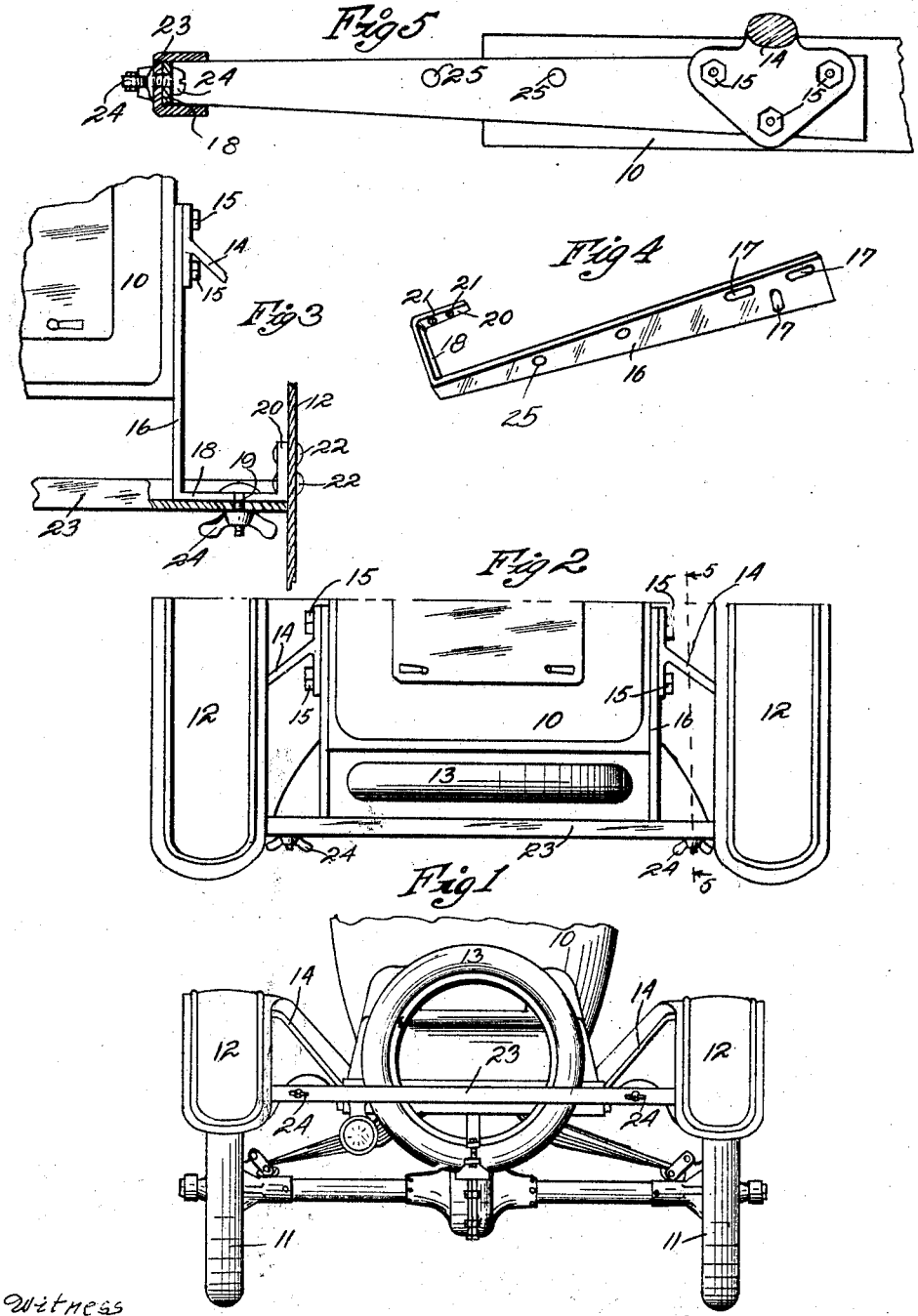
Inventor
Walter H. Thomas
By Bair & Freeman
Attorneys

UNITED STATES PATENT OFFICE.

WALTER H. THOMAS, OF SPENCER, IOWA.

COMBINATION FENDER-BRACE AND BUMPER.

1,379,946.     Specification of Letters Patent.     Patented May 31, 1921.

Application filed October 9, 1920. Serial No. 415,726.

*To all whom it may concern:*

Be it known that I, WALTER H. THOMAS, a citizen of the United States, and a resident of Spencer, in the county of Clay and State of Iowa, have invented a certain new and useful Combination Fender-Brace and Bumper, of which the following is a specification.

The object of my invention is to provide a combination fender brace and bumper, which is of simple, durable and inexpensive construction, that can be readily and easily installed upon an automobile.

More particularly it is my object to provide a means for bracing preferably the rear fenders and for forming a bumper, which will somewhat prevent the smashing of the body of the automobile, and at the same time serve as a brace for rigidly holding the fenders of the automobile against undesired movement.

A further object is to provide in such a device, a combination fender brace and bumper support, which when installed will hold the fender against undesired movement relative to the automobile proper.

Still a further object is to provide brace members at either side of the automobile body adapted to be fixed to the automobile body and to the fenders and a bumper member adapted to extend between the braces, whereby movement of the fenders relative to each other will be substantially eliminated.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a rear elevation of a part of the automobile with my improved device installed thereon.

Fig. 2 is a top view of the same.

Fig. 3 is a detail, sectional view of one of the combination fender braces and bumper supports, as applied to an automobile.

Fig. 4 is a perspective view of one of the fender braces and bumper supports; and Fig. 5 is a sectional view taken on the line 5—5 of Fig. 2.

In the accompanying drawings, I have used the reference numeral 10 to indicate the ordinary body of an automobile, preferably of the Ford type, which is provided with the rear wheels 11 and the rear fenders 12. A spare casing 13 is shown applied directly between the fenders 12 and behind the body 10.

It will be understood that the fenders 12 extend rearwardly slightly beyond the rear limit of the body 10, as shown in Fig. 2 of the drawings. A pair of braces 14 extend from the vehicle body 10 and are fixed to the fenders 12. The braces 14 are held to the vehicle body 10 by means of the bolts 15.

My improved device comprises a pair of combination fender braces and bumper supports 16, substantially as illustrated in Fig. 4 of the drawings. Elongated openings 17 are provided near the forward end of the combination brace and support 16, and are designed to receive the ends of the bolts 15, which normally hold the braces 14 to the vehicle body 10.

The elongated openings also permit some slight adjustment of the parts, in order to take up for any inaccuracy in the spacing of the bolts 15 or any other inaccuracy which might arise.

The combination brace and support 16 is preferably made of strap material and is substantially triangular in outline when blanked out of the material.

When the combination braces and supports 16 are installed, the bolts 15 are removed and the braces 14 are then spaced slightly from the vehicle body 10. The combination brace and support 16 is then placed between the vehicle body and the brace 14. The bolts 15 are then again placed in position, thus locking the braces 14 and the combination brace and fender support to the vehicle body 10.

It will be seen in Fig. 2, that the rear end of the combination fender brace and bumper support extends rearwardly beyond the rear edge of the vehicle body 10. Each of the combination fender braces and bumper supports 16 is provided with a portion 18, which is provided with an opening 19. A short forward extension 20 is formed from the free end of the portion 18, and is provided with a pair of openings 21. The extension 20 is designed to rest against the sides of the fenders 12 and to be fastened thereto by means of the rivets or other suitable fastenings 22.

It will be understood that when the combination fender brace and bumper support is fixed to the vehicle body and to the fender that a rigid construction is substantially formed, so as to prevent any undesired movement of the fender relative to the vehicle body.

It will, however, be seen that the parts possess sufficient resiliency, that were the fender bumped into by some object, the parts would give and the shock would be to a great extent absorbed, since the device connects the fenders with the body and thus the shock imposed upon just a portion only of the fender.

In order to lock the two fenders against movement relative to each other, a bumper member 23 is provided, which is substantially channel-shaped in cross section, and is provided with a pair of openings near each of its ends, which are designed to register with the openings 19 formed in the portion 18. Extended through the registering openings are the detachable fastening devices 24. The ends of the bumper member 23 rest against the sides of the fenders 12.

It will be seen that when the bumper member is installed and the fastening devices 24 are used, that the two fenders would substantially be locked together against movement independent of each other.

Yet it will be understood that it is desirable to gain access to the rear end of the body and also for removing the spare casing 13.

It will be seen that by providing the detachable fastening devices 24, that when access is desired to the rear end of the vehicle body, this is easily accomplished by removing the bumper member 23.

Openings 25 are provided in the combination fender brace and bumper support, so that if it is desired to reinforce the braces and supports, additional bolts may be extended therethrough and through the vehicle body 10.

From the construction of the parts just described, it will be seen that my device is of simple construction, and can be readily installed without the necessity or use of any complicated tools or machinery, and will afford such a brace for the fenders, as is desired, and will also provide novel means for fastening a bumper member, which will both serve as a bumper and as a transverse brace for locking the two fenders against movement relative to each other.

One of the advantages of rigidly fastening the fenders to the vehicle body is that when going over rough roads, the springs of the vehicle body will form a cushioning effect for the fenders, as well as for the body of the vehicle. When the fenders are comparatively loose relative to the vehicle body, such effect is not obtained, which results in the short life of the fenders.

Some changes may be made in the arrangement and construction of the various parts of my device, without departing from the essential features and purposes of my invention, and it is my intention to cover by my claims, any modified forms of structure or use of mechanical equivalent, which may be reasonably included within their scope.

I claim as my invention:

1. In combination with a vehicle body having a pair of fenders and braces extending from the body to said fenders, fastening devices for holding said braces to said body, combination fender braces and bumper supports fastened to said body by said fastening devices and fastened to said fenders, a bumper member, detachably fastened to said combination fender braces and bumper supports and adapted to extend transversely between said fenders, whereby undesired movement of the fenders relative to the body will be eliminated.

2. In combination with a vehicle body having a pair of fenders and braces extended from the body to said fenders, fastening devices for holding said braces to said body, combination fender braces and bumper supports fastened to said body by said fastening devices and fastened to said fenders, a bumper member detachably fastened to said combination fender braces and bumper supports and adapted to extend transversely between said fenders, the parts being so arranged that the bumper member may be detached, so that access may be had to the rear end of the body.

3. In combination with a vehicle body having a pair of fenders, combination fender braces and bumper supports, each having one end fixed to one side of said vehicle body and the other end to said fenders, and a bumper member fixed to said combination fender braces and bumper supports and adapted to extend transversely between said fenders.

4. In combination with a vehicle body having a pair of fenders and brace members for supporting the fenders on said vehicle body, combination fender braces and bumper supports each having one end fixed to one side of said vehicle body and the other end to said fenders, and a bumper member fixed to said combination fender braces and bumper supports, said bumper member being detachable, so that access to the rear end of the vehicle body may be had.

5. In combination with a vehicle body having a pair of fenders and brace members for supporting the fenders on said vehicle body, a combination fender brace and bumper support, having one end fixed to each side of said vehicle body and the other end to said fenders, said combination fender brace and bumper support being formed with a pair of parallel sides of different lengths and having one of their ends connected with a cross portion, said last portion being provided with an opening, a bumper member having an opening at each end adapted to extend between said fenders and have said openings register with said first opening, whereby a detachable fastening device may be used for securing said bumper member to said combination fender brace and bumper support.

Des Moines, Iowa, August 30, 1920.

WALTER H. THOMAS.